(12) United States Patent
Oura et al.

(10) Patent No.: US 11,738,543 B2
(45) Date of Patent: Aug. 29, 2023

(54) MULTILAYER STRUCTURE, AND STANDUP POUCH INCLUDING THE MULTILAYER STRUCTURE

(71) Applicant: Mitsubishi Chemical Corporation, Tokyo (JP)

(72) Inventors: Kohei Oura, Tokyo (JP); Shinji Nakanishi, Tokyo (JP); Mei Takatsuka, Tokyo (JP); Yoshitaka Matsumura, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 145 days.

(21) Appl. No.: 17/469,277

(22) Filed: Sep. 8, 2021

(65) Prior Publication Data

US 2021/0402747 A1 Dec. 30, 2021

Related U.S. Application Data

(63) Continuation of application No. PCT/JP2020/012090, filed on Mar. 18, 2020.

(30) Foreign Application Priority Data

Mar. 22, 2019 (JP) ................... 2019-055059

(51) Int. Cl.
*B32B 27/08* (2006.01)
*B32B 1/00* (2006.01)
(Continued)

(52) U.S. Cl.
CPC ............... *B32B 27/08* (2013.01); *B32B 1/00* (2013.01); *B32B 7/12* (2013.01); *B32B 27/306* (2013.01);
(Continued)

(58) Field of Classification Search
CPC .. B32B 27/08; B32B 1/00; B32B 7/12; B32B 27/306; B32B 27/32; B32B 27/34; B65D 65/40; B65D 75/008; B65D 2270/00
See application file for complete search history.

(56) References Cited

U.S. PATENT DOCUMENTS 5,482,771 A 1/1996 Shah
5,777,055 A 7/1998 Peiffer et al.
(Continued)

FOREIGN PATENT DOCUMENTS

CN 107709186 A 2/2018
JP H03-076646 A 4/1991
(Continued)

OTHER PUBLICATIONS

ISR issued in WIPO Patent Application No. PCT/JP2020/012090, Jun. 23, 2020.
(Continued)

*Primary Examiner* — Lawrence D Ferguson
(74) *Attorney, Agent, or Firm* — GREENBLUM & BERNSTEIN, P.L.C.

(57) ABSTRACT

A multilayer structure includes a protective layer, an ethylene-vinyl alcohol copolymer layer, a heat seal resin layer, and an intermediate layer provided between the ethylene-vinyl alcohol copolymer layer and the heat seal resin layer and containing a polypropylene resin, wherein the intermediate layer further contains a hydrocarbon resin having a number average molecular weight of 100 to 3,000, and a softening point of not less than 60° C. and less than 170° C. The multilayer structure satisfies requirements for a lower water vapor permeability and a sufficient heat seal strength, and provides a standup pouch having a smaller gas barrier property change rate after retort treatment.

7 Claims, 1 Drawing Sheet

(51) Int. Cl.

| | | |
|---|---|---|
| *B32B 7/12* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B65D 65/40* | (2006.01) | |
| *B65D 75/00* | (2006.01) | |

(52) U.S. Cl.
 CPC .............. *B32B 27/32* (2013.01); *B32B 27/34* (2013.01); *B32B 27/36* (2013.01); *B65D 65/40* (2013.01); *B65D 75/008* (2013.01); *B32B 2250/05* (2013.01); *B32B 2250/24* (2013.01); *B32B 2307/31* (2013.01); *B32B 2439/46* (2013.01)

(56) References Cited

U.S. PATENT DOCUMENTS 6,087,446 A 7/2000 Klosiewicz
2002/0103300 A1 8/2002 Klosiewicz
2007/0172614 A1 7/2007 Lee
2018/0099493 A1 4/2018 Usui

FOREIGN PATENT DOCUMENTS

| JP | H03-178435 A | 8/1991 |
| JP | H06-198826 A | 7/1994 |
| JP | H07-179625 A | 7/1995 |
| JP | H10-025349 A | 1/1998 |
| JP | 2004-243562 A | 9/2004 |
| JP | 2009-102651 A | 5/2009 |
| JP | 2016-203634 A | 12/2016 |
| JP | 2017-226145 A | 12/2017 |
| JP | 2019-177909 A | 10/2019 |
| WO | 2015/005279 | 1/2015 |

OTHER PUBLICATIONS

IPRP issued in WIPO Patent Application No. PCT/JP2020/012090, Sep. 28, 2021.
Office Action issued in Chinese Patent Application No. 202080018063.3, dated Sep. 23, 2022, translation.
European Search Report issued with respect to application No. 20777028.0, dated Mar. 23, 2022.

MULTILAYER STRUCTURE, AND STANDUP POUCH INCLUDING THE MULTILAYER STRUCTURE

RELATED APPLICATION

This application is a continuation of International Application No. PCT/JP2020/012090, filed on Mar. 18, 2020, which claims priority to Japanese Patent Application No. 2019-055059, filed on Mar. 22, 2019, the entire contents of each of which being hereby incorporated by reference.

TECHNICAL FIELD

The present disclosure relates to a multilayer structure, and a standup pouch including the multilayer structure. More specifically, the present disclosure relates to a multilayer structure which satisfies requirements for a lower water vapor permeability and a sufficient heat seal strength and is capable of providing a packaging material or the like having a smaller gas barrier property change rate after retort treatment, and to a standup pouch including the multilayer structure.

BACKGROUND ART

The retort treatment (e.g., hot water treatment at 120° C. for 30 minutes) is one of widely known sterilization techniques for increasing the shelf life periods of food products. Retort packaging materials for food and beverage products are required to have a higher oxygen barrier property in order to prevent odor transfer to the packaged contents and the deterioration of the packaged contents due to oxidation during the storage of the products after the retort treatment.

Conventionally, bottles and cans are used as the retort packaging materials for the food and beverage products but, from the viewpoint of easy disposal, customer convenience, and the like, soft packages employing a multilayer structure are developed. In particular, self-supporting packaging bags (hereinafter sometimes referred to as "standup pouches") are widely used, which ensure neat display of the products. For the standup pouches, there are a variety of multilayer structures which each have a sufficient rigidity for the self-supporting property when the standup pouches are filled with the contents and have a sufficient oxygen barrier property for the prevention of the deterioration of the contents.

Examples of the multilayer structures for the standup pouches include multilayer structures produced by laminating at least one selected from the group consisting of a stretch film of polyethylene terephthalate (hereinafter sometimes referred to as "PET"), a stretch film of nylon (hereinafter sometimes referred to as "Ny"), and an aluminum foil (hereinafter sometimes referred to as "AL foil" to be used as a barrier layer) on a heat seal resin layer primarily containing polypropylene such as cast polypropylene (hereinafter sometimes referred to as "CPP") as having layer configurations of PET stretch film/Ny stretch film/AL foil/CPP, PET stretch film/AL foil/Ny stretch film/CPP, and PET stretch film/AL foil/CPP.

Where a standup pouch including the AL foil as the barrier layer is used as the food packaging material, however, there is a problem that a microwave oven cannot be used. Therefore, a standup pouch including no AL foil is increasingly demanded.

To solve this problem, a retort standup pouch is disclosed, for example, in PTL 1. The retort standup pouch includes a laminate material including a protective layer, and a polyamide resin layer, an ethylene-vinyl alcohol copolymer (hereinafter sometimes referred to as "EVOH") layer, and a heat seal resin layer provided on one side of the protective layer, wherein the polyamide resin layer and the EVOH layer are adjacent to each other.

However, the standup pouch disclosed in PTL 1 needs to be improved in bag drop impact resistance (which is a feature such that the standup pouch is free from the cracking of the multilayer structure thereof, the breakage of the multilayer structure thereof, and the leakage of the content, when the standup pouch is dropped to receive an instantaneous flexural impact) during transportation thereof.

For the improvement of the bag drop impact resistance of the standup pouch, PTL 2 discloses a standup pouch multilayer structure including a protective layer, a heat seal resin layer, and an EVOH layer provided between the protective layer and the heat seal resin layer, wherein the heat seal resin layer is composed of a resin composition containing a thermoplastic elastomer, wherein the thermoplastic elastomer is present at a lower concentration in a surface portion of the heat seal resin layer opposite from the protective layer than in a surface portion of the heat seal resin layer adjacent to the protective layer.

RELATED ART DOCUMENTS

Patent Documents

PTL 1: JP-A-2016-203634
PTL 2: JP-A-2017-226145

SUMMARY

In the standup pouch disclosed in PTL 2, the heat seal resin layer contains an elastomer component for the improvement of the bag drop impact resistance where the multilayer structure including the barrier layer containing the EVOH is used. According to studies conducted by the inventors of the present disclosure, however, the elastomer component is likely to significantly increase the water vapor permeability of the standup pouch to thereby adversely influence the content in the standup pouch after the packaging of the product. For example, the moisture of the content is liable to escape out of the standup pouch, resulting in the deterioration of the quality of the content in the standup pouch. That is, the standup pouch disclosed in PTL 2 has a higher water vapor permeability and, therefore, needs improvement with respect to the water vapor permeability.

In view of the foregoing, it is an object of the present disclosure to provide a multilayer structure which satisfies requirements for a lower water vapor permeability and a sufficient heat seal strength and is capable of providing a standup pouch or the like having a smaller gas barrier property change rate after the retort treatment.

The inventors conducted intensive studies to solve the aforementioned problem. As a result, the inventors found that the aforementioned problem can be solved where the multilayer structure includes an ethylene-vinyl alcohol copolymer layer, a heat seal resin layer, and an intermediate layer provided between the ethylene-vinyl alcohol copolymer layer and the heat seal resin layer, and the intermediate layer contains a polypropylene resin and a specific hydrocarbon resin. Thus, the inventors achieved the present disclosure.

The present disclosure relates to the following items <1> to <7>:

<1> A multilayer structure includes a protective layer, an ethylene-vinyl alcohol copolymer layer, a heat seal resin layer, and an intermediate layer provided between the ethylene-vinyl alcohol copolymer layer and the heat seal resin layer and containing a polypropylene resin, wherein the intermediate layer further contains a hydrocarbon resin having a number average molecular weight of 100 to 3,000, and a softening point of not less than 60° C. and less than 170° C.

<2> In the multilayer structure of Item <1>, the hydrocarbon resin is present in a proportion of 1 to 30 wt. % based on the overall amount of a resin composition forming the intermediate layer.

<3> In the multilayer structure of Item <1> or <2>, the polypropylene resin is homopolypropylene.

<4> In the multilayer structure of any of Items <1> to <3>, the heat seal resin layer is provided adjacent to one major surface of the intermediate layer.

<5> The multilayer structure of any of Items <1> to <4> further includes a polyamide resin layer provided adjacent to at least one major surface of the ethylene-vinyl alcohol copolymer layer.

<6> The multilayer structure of any of Items <1> to <5> has an overall thickness of not less than 30 μm.

<7> A standup pouch includes the multilayer structure of any of Items <1> to <6>.

According to the present disclosure, the multilayer structure is provided, which satisfies requirements for a lower water vapor permeability and a sufficient heat seal strength, and is capable of providing a standup pouch having a smaller gas barrier property change rate after the retort treatment.

According to the present disclosure, the multilayer structure is provided, which is capable of providing a standup pouch. More specifically, the multilayer structure has a lower water vapor permeability and, therefore, the standup pouch is free from the adverse influence on the content in the pouch, e.g., suppresses the deterioration of the quality of the content. Further, the multilayer structure has a sufficient heat seal strength and, therefore, the standup pouch is excellent in bag drop impact resistance and storage stability, and has a smaller gas barrier property change rate after the retort treatment.

DESCRIPTION OF EMBODIMENTS

Preferred embodiments of the present disclosure will hereinafter be described in detail by way of example but not by way of limitation.

In the present disclosure, a side of the standup pouch on which the content is accommodated (i.e., a heat seal side) is referred to as "inner side," and a side of the standup pouch opposite from the inner side is referred to as "outer side."

In the following description, the terms "upper," "lower," "left," "right," and the like are used to indicate the corresponding directions in the drawings for convenience.

The term "film" generally means a thin flat product having a thickness that is significantly smaller than its length and width with its maximum thickness being limited to a given level, and is generally supplied in a roll form. The term "sheet" generally means a flat product (as specified by Japanese Industrial Standards JIS K6900) having a thickness that is generally smaller than its length and width. However, there is no significant difference between the sheet and the film. Without the need for distinction between these terms, the term "film" is intended to include the sheet, and the term "sheet" is intended to include the film.

[Multilayer Structure]

The multilayer structure according to the present disclosure includes a protective layer, a barrier layer, an intermediate layer, and a heat seal resin layer.

Figure 1:
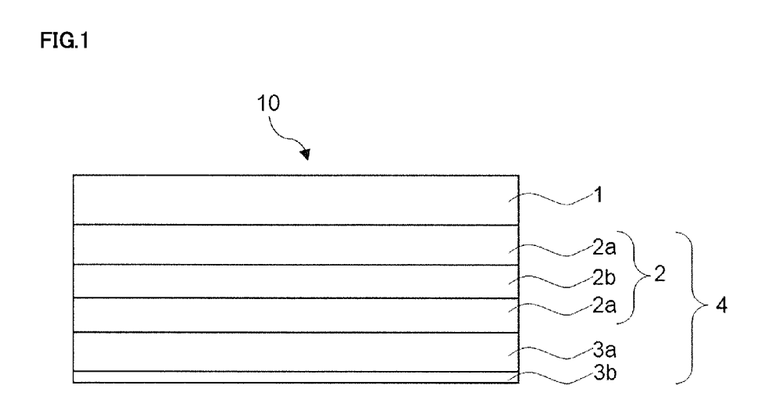
FIG. 1 is a schematic sectional view showing the construction of a multilayer structure according to one embodiment of the present disclosure.
Figure 2:
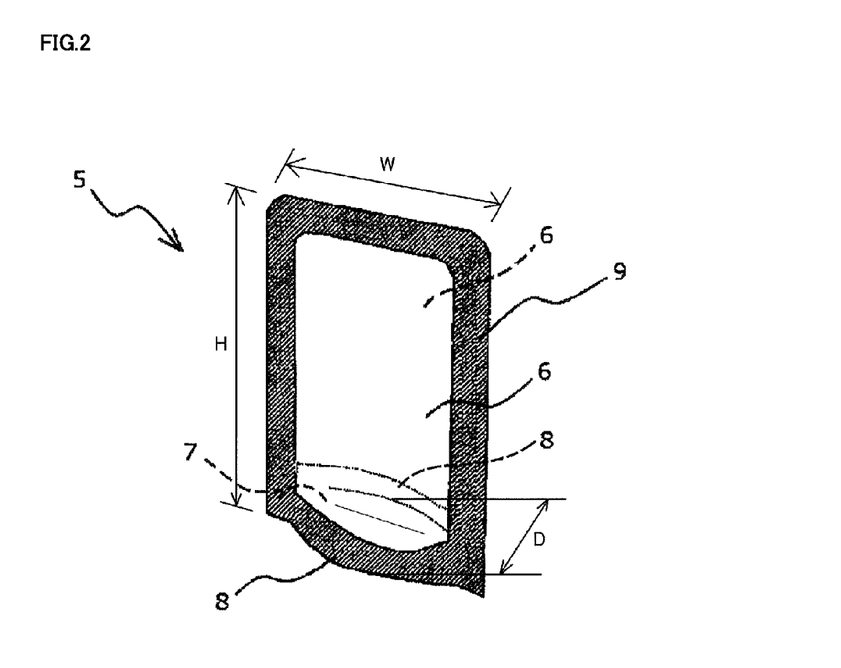
FIG. 2 is an overall perspective view illustrating a standup pouch according to another embodiment of the present disclosure, which includes the multilayer structure.

According to a preferred embodiment, as shown in FIGS. 1 and 2, the multilayer structure of the present disclosure is, for example, a multilayer structure 10 to be used for a standup pouch or the like. The multilayer structure 10 is configured by laminating a multilayer material 4 on a protective layer 1. The multilayer material 4 includes a barrier layer 2, an intermediate layer 3a, and a heat seal resin layer 3b. The barrier layer 2 includes polyamide resin layers 2a and an EVOH layer 2b.

The respective layers will hereinafter be described.

<Protective Layer>

The protective layer to be used in the present disclosure is a base of the multilayer structure of the present disclosure. In the present disclosure, a film or a sheet of a resin having higher mechanical, physical, and chemical strengths and excellent in piercing resistance, heat resistance, moisture resistance, pinhole resistance, and transparency is used as the protective layer.

Specific examples of the resin to be used for the film or the sheet include polyester resins such as polyethylene terephthalate and polyethylene naphthalate, polyamide resins such as various types of nylon resins, polyaramid resins, polypropylene resins, polyethylene resins, polycarbonate resins, polyacetal resins, fluororesins, and other tough resins. Films and sheets of these resins may be used alone or in combination. Particularly, the films and the sheets formed from the polyester resins are preferred, and the films and the sheets formed from the polyethylene terephthalate are more preferred.

The resin film or sheet may be an unstretched film, or may be a uniaxially or biaxially stretched film.

The protective layer preferably has a thickness of 5 to 100 μm, more preferably 10 to 50 μm. If the thickness of the protective layer is excessively great, the costs tend to be increased. If the thickness of the protective layer is excessively small, on the other hand, the strengths, the piercing resistance, and the like tend to be deteriorated.

As required, the protective layer may be provided with a print layer. The print layer may be, for example, a layer formed from an ink prepared by mixing a solvent, a binder resin such as of urethane, acryl, nitrocellulose, or rubber, a pigment such as extender pigment, a plasticizer, a desiccant, a stabilizer, and the like.

The print layer may be a print of characters, patterns, and/or the like. Usable printing methods include known printing methods such as offset printing, gravure printing, flexographic printing, silk screen printing, and inkjet printing. The surface of the protective layer may be pretreated through corona treatment or ozone treatment, whereby the adhesion between the print layer and the protective layer is improved. The print layer is typically provided on the inner surface of the protective layer.

<Barrier Layer>

The barrier layer to be used in the present disclosure includes an EVOH layer. The barrier layer preferably further includes a polyamide resin layer in order to facilitate the recovery of the oxygen barrier property after the retort treatment.

(EVOH Layer)

The EVOH layer may be a layer formed of EVOH, or may be a layer formed of an EVOH resin composition containing EVOH and a component other than the EVOH. In the EVOH resin composition, the EVOH is typically present in a proportion of not less than 50 wt. %, preferably not less than 60 wt. %, more preferably 70 to 100 wt. %.

The EVOH is typically a water-insoluble thermoplastic resin prepared by saponifying a copolymer of ethylene and a vinyl ester monomer (ethylene-vinyl ester copolymer). A known polymerization method such as solution polymerization method, suspension polymerization method or emulsion polymerization method may be used for polymerization of ethylene and the vinyl ester monomer. In general, a solution polymerization method using a lower alcohol such as methanol as a solvent is used. The saponification of the resulting ethylene-vinyl ester copolymer can be achieved by a known method. The EVOH thus prepared contains an ethylene structural unit and a vinyl alcohol structural unit as major structural units, and further contains a slight amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be typically each used alone or, as required, a plurality of vinyl esters may be selected from these vinyl esters to be used in combination.

The EVOH preferably has an ethylene content of 20 to 60 mol %, more preferably 25 to 50 mol %, particularly preferably 25 to 35 mol %, as measured in conformity with ISO14663. If the ethylene content of the EVOH is excessively low, the high-humidity oxygen barrier property and the melt formability tend to be poorer. If the ethylene content of the EVOH is excessively high, on the other hand, the oxygen barrier property tends to be poorer.

The EVOH preferably has a vinyl ester saponification degree of 90 to 100 mol %, more preferably 95 to 100 mol %, particularly preferably 98 to 100 mol %, as measured in conformity with JIS K6726 (with the use of a solution obtained by homogeneously dissolving the EVOH in a water/methanol solvent). If the saponification degree of the EVOH is excessively low, the oxygen barrier property, the heat stability, the moisture resistance, and the like tend to be poorer.

The EVOH preferably has a melt flow rate (MFR) of 0.5 to 100 g/10 minutes, more preferably 1 to 50 g/10 minutes, particularly preferably 3 to 35 g/10 minutes (as measured at 210° C. with a load of 2160 g). If the MFR of the EVOH is excessively high, the film formability tends to be poorer. If the MFR of the EVOH is excessively low, the melt viscosity tends to be excessively high, making the melt extrusion difficult.

The EVOH may further contain a structural unit derived from a comonomer other than the ethylene structural unit and the vinyl alcohol structural unit (and the unsaponified vinyl ester structural unit). Examples of the comonomer include: α-olefins such as propylene, isobutene, α-octene, α-dodecene, and α-octadecene; hydroxyl-containing α-olefins such as 3-buten-1-ol, 4-penten-1-ol, and 3-butene-1,2-diol, and hydroxyl-containing α-olefin derivatives such as esterification products and acylation products of these hydroxyl-containing α-olefins; unsaturated carboxylic acids, and salts, partial alkyl esters, full alkyl esters, nitriles, amides, and anhydrides of the unsaturated carboxylic acids; unsaturated sulfonic acids, and salts of the unsaturated sulfonic acids; and vinylsilane compounds, vinyl chloride, and styrene. These may be used alone or in combination.

Post-modified EVOHs such as urethanized, acetalized, cyanoethylated, and oxyalkylenated EVOHs are also usable as the EVOH.

Of these modified EVOHs, an EVOH having a primary hydroxyl group introduced into its side chain by copolymerization is preferred, because excellent secondary formability can be ensured in a stretching process, a vacuum/air pressure forming process, and the like. Particularly, an EVOH having a 1,2-diol structure in its side chain is preferred.

Additives generally blended to the EVOH may be added to the EVOH, as long as the effects of the present disclosure are not impaired. Examples of the additives include heat stabilizer, antioxidant, antistatic agent, colorant, UV absorber, lubricant, plasticizer, photo stabilizer, surfactant, antibacterial agent, desiccant, antiblocking agent, flame retardant, crosslinking agent, curing agent, foaming agent, crystal nucleating agent, antifogging agent, biodegradable additive, silane coupling agent, and oxygen absorber, which may be used alone or in combination.

The heat stabilizer is used for improvement of various physical properties such as heat stability in melt forming. Examples of the heat stabilizer include: organic acids such as acetic acid, propionic acid, butyric acid, lauryl acid, stearic acid, oleic acid, and behenic acid, and salts such as alkali metal salts (sodium salts, potassium salts, and the like), alkali earth metal salts (calcium salts, magnesium salts, and the like), and zinc salts of the organic acids; and inorganic acids such as sulfuric acid, sulfurous acid, carbonic acid, phosphoric acid, and boric acid, and salts such as alkali metal salts (sodium salts, potassium salts, and the like), alkali earth metal salts (calcium salts, magnesium salts, and the like), and zinc salts of the inorganic acids.

The EVOH may be a mixture of different EVOHs, which have different ethylene contents, different saponification degrees, different melt flow rates (MFRs) (as measured at 210° C. with a load of 2160 g), different copolymerization components, different modification degrees (e.g., different 1,2-diol structural unit contents), and the like.

The EVOH layer is preferably composed of an EVOH resin composition containing the EVOH and a polyamide resin from the viewpoint of retort treatment resistance. The polyamide resin is capable of forming a network structure by the interaction of its amide bonds with hydroxyl groups and/or ester groups of the EVOH, thereby preventing the EVOH from being released from the EVOH layer during the retort treatment. A known polyamide resin may be used as the polyamide resin. Examples of the polyamide resin include those to be used for the polyamide resin layer to be described later. In the EVOH layer, the polyamide resin is preferably present in a proportion of 1 to 30 wt. %, more preferably 3 to 25 wt. %, still more preferably 5 to 20 wt. %, based on the overall amount of the EVOH resin composition.

The EVOH layer preferably has a thickness (Te) of 1 to 35 μm, more preferably 5 to 30 μm, particularly preferably 8 to 25 μm. If the thickness (Te) is excessively small, the oxygen barrier property tends to be poorer. If the thickness (Te) is excessively great, the recovery speed of the oxygen barrier property after the retort treatment tends to be reduced. Where the EVOH layer includes a plurality of EVOH layers, the total thickness of the plural EVOH layers may fall within the aforementioned range.

(Polyamide Resin Layer)

The polyamide resin layer may be a layer formed of a polyamide resin, or may be a layer formed of a polyamide resin composition containing a polyamide resin and a component other than the polyamide resin. In the polyamide resin composition, the polyamide resin is typically present in a proportion of not less than 50 wt. %, preferably not less than 60 wt. %, more preferably 70 to 100 wt. %.

In the present disclosure, a known polyamide resin may be used as the polyamide resin for the polyamide resin composition. Examples of the polyamide resin include homopolymers such as polycapramide (nylon 6), poly-ω-aminoheptanoic acid (nylon 7), poly-ω-aminononanoic acid (nylon 9), polyundecanamide (nylon 11), and polylauryllactam (nylon 12), which may be used alone or in combination.

Other examples of the polyamide resin include copolymerized polyamide resins including: aliphatic copolymerized polyamides such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryllactam copolymer (nylon 6/12), caprolactam/ω-aminononanoic acid copolymer (nylon 6/9), caprolactam/hexamethylenediammonium adipate copolymer (nylon 6/66), lauryllactam/hexamethylenediammonium adipate copolymer (nylon 12/66), ethylenediamine adipamide/hexamethylenediammonium adipate copolymer (nylon 26/66), caprolactam/hexamethylenediammonium adipate/hexamethylenediammonium sebacate copolymer (nylon 66/610), and ethyleneammonium adipate/hexamethylenediammonium adipate/hexamethylenediammonium sebacate copolymer (nylon 6/66/610); aromatic copolymerized polyamides such as polyhexamethylene isophthalamide, polyhexamethylene terephthalamide, poly-m-xylylene adipamide (polyamide MXD6), hexamethylene isophthalamide/terephthalamide copolymer, poly-p-phenylene terephthalamide, and poly-p-phenylene/3,4'-diphenyl ether terephthalamide; and amorphous polyamides, and terminal-modified polyamides prepared by terminal-modifying any of the aforementioned polyamide resins with carboxyl group or amino group of methylenebenzylamine or m-xylenediamine. These polyamide resins may be used alone or in combination.

In order to efficiently provide the effects of the present disclosure, the polyamide resin layer to be used in the present disclosure preferably contains at least one selected from the group consisting of polycapramide (nylon 6), caprolactam/hexamethylenediammonium adipate copolymer (nylon 6/66), and poly-m-xylylene adipamide (polyamide MXD6). The polyamide resin layer more preferably contains caprolactam/hexamethylenediammonium adipate copolymer (nylon 6/66) and poly-m-xylylene adipamide (polyamide MXD6), and particularly preferably contains poly-m-xylylene adipamide (polyamide MXD6).

The polyamide resin layer to be used in the present disclosure preferably has a thickness (Tp) of 1 to 100 μm, more preferably 1 to 80 μm, still more preferably 3 to 60 μm, particularly preferably 5 to 40 μm. The polyamide resin layer to be used in the present disclosure may include a single layer or a plurality of layers. Where the polyamide resin layer includes the plural layers, the polyamide resin layer preferably has an overall thickness (Tpt) of 2 to 120 μm, more preferably 5 to 90 μm, particularly preferably 10 to 80 μm.

Where the polyamide resin layer includes the plural layers, the plural layers may be formed of the same polyamide resin, or may be formed of different polyamide resins.

If the thickness (Tp) of the polyamide resin layer is excessively great, the thickness of a standup pouch produced from the multilayer structure has a greater overall thickness. Therefore, the standup pouch entirely has a higher rigidity, so that the unsealability of the standup pouch tends to be poorer and a consumer is likely to hurt his or her hands. Further, the polyamide resin layer is liable to absorb a great amount of water in the retort treatment and, therefore, the recovery speed of the oxygen barrier property after the retort treatment tends to be reduced.

In the present disclosure, the openability means a property such that the mouth of the standup pouch can be easily opened by applying gas (e.g., air) to the mouth when the standup pouch is filled with food or the like for automatic packaging.

<Intermediate Layer>

The multilayer structure of the present disclosure further includes the intermediate layer between the EVOH layer and the heat seal resin layer. Particularly, it is important that the intermediate layer contains a polypropylene resin and further contains a hydrocarbon resin having a number average molecular weight of 100 to 3,000 and a softening point of not lower than 60° C. and lower than 170° C.

(Polypropylene Resin)

Examples of the polypropylene resin include homopolypropylene (propylene homopolymer), and random copolymers or block copolymers of propylene with α-olefin such as ethylene, 1-butene, 1-pentene, 1-hexene, 1-heptene, 1-octene, 1-nonene or 1-decene. These may be used alone or in combination. Particularly, the intermediate layer preferably contains the homopolypropylene as the polypropylene resin for further suppression of the water vapor permeability.

In a resin composition for the intermediate layer, the polypropylene resin is preferably present in a proportion of 60 to 99 wt. %, more preferably 70 to 97 wt. %, still more preferably 80 to 95 wt. %, based on the overall amount of the resin composition for the intermediate layer. If the proportion of the polypropylene resin is smaller than the aforementioned range, the polypropylene resin is liable to be released from the intermediate layer during the retort treatment.

(Hydrocarbon Resin)

The hydrocarbon resin to be used in the present disclosure has a number average molecular weight of 100 to 3,000 and a softening point of not lower than 60° C. and lower than 170° C. The hydrocarbon resin belongs to thermoplastic resins that are generally liquid or solid at an ordinary temperature (23° C.)

Specific examples of the hydrocarbon resin include: natural hydrocarbon resins including rosin resins (rosin, modified rosins such as hydrogenated rosin, disproportionated rosin, and polymerized rosin, and rosin esters such as glycerin esters and pentaerythritol esters of the modified rosins), and terpene resins (polyterpenes, aromatic modified terpene resins, hydrogenated terpene resins, and terpene phenol resins); and synthetic hydrocarbon resins such as petroleum resins, coumarone indene resins, phenol resins (alkylphenol resins, rosin-modified phenol resins, and the like), styrene resins, and xylene resins. These may be used alone or in combination.

The petroleum resins mean resins obtained by polymerizing a fraction containing unsaturated hydrocarbon monomers by-produced by pyrolysis of petroleum naphtha or the like. Specifically, the petroleum resins are classified into aliphatic petroleum resin (C5 petroleum resin), aromatic petroleum resin (C9 petroleum resin), aliphatic/aromatic petroleum resin (C5/C9 petroleum resin), and alicyclic petroleum resin (hydrogenated petroleum resin).

The aliphatic petroleum resin (C5 petroleum resin) is a synthetic resin obtained by polymerizing a refined C5 fraction of cracked petroleum naphtha. Specific examples of the aliphatic petroleum resin (C5 petroleum resin) include QUINTON 100 series (available from Zeon Corporation), and ESCOREZ 1000 series (available from Exxon Mobil Corporation).

The aromatic petroleum resin (C9 petroleum resin) is a synthetic resin obtained by polymerizing a refined C9 fraction of cracked petroleum naphtha. Specific examples of the aromatic petroleum resin (C9 petroleum resin) include PETCOAL (available from Tosoh Corporation), and NISSEKI NEOPOLYMER (available from ENEOS Corporation).

The aliphatic/aromatic petroleum resin (C5/C9 petroleum resin) is a synthetic resin obtained by copolymerizing the aforementioned C5 fraction and C9 fraction blended together. Specific examples of the aliphatic/aromatic petroleum resin (C5/C9 petroleum resin) include PETROTACK (available from Tosoh Corporation), TOHO HIGH RESIN (available from Toho Chemical Industry Co., Ltd.), QUINTON 100 series (available from Zeon Corporation), and ESCOREZ 2000 series (available from Exxon Mobil Corporation).

Examples of the alicyclic petroleum resin include a hydrogenated petroleum resin obtained by hydrogenating the aromatic petroleum resin or the aliphatic/aromatic petroleum resin, and a synthetic resin synthesized by using dicyclopentadiene extracted from the C5 fraction as a main material.

Particularly, the hydrogenated petroleum resin obtained by hydrogenating the aromatic petroleum resin or the aliphatic/aromatic petroleum resin is a typical example. Specific examples of the hydrogenated petroleum resin include ARKON (available from Arakawa Chemical Industries, Ltd.), I-MARV (available from Idemitsu Kosan Co., Ltd.), and ESCOREZ 5000 series (available from Exxon Mobil Corporation).

These hydrogenated petroleum resins have different polarities depending on the hydrogenation degree, and are typically classified into two types, i.e., a full hydrogenation type having a hydrogenation degree of not less than 90% and a partial hydrogenation type having a hydrogenation degree of less than 90%. Examples of the former type include ARKON P GRADE (available from Arakawa Chemical Industries, Ltd.), and I-MARV P TYPE (available from Idemitsu Kosan Co., Ltd.) Examples of the latter type include ARKON M GRADE (available from Arakawa Chemical Industries, Ltd.), and I-MARV S TYPE (available from Idemitsu Kosan Co., Ltd.)

Specific examples of an alicyclic petroleum resin obtained by a method other than the hydrogenation, i.e., the synthetic resin synthesized by using dicyclopentadiene extracted from the C5 fraction as the main material, include QUINTON 1000 series (available from Zeon Corporation), and MARU-KAREZ M series (available from Maruzen Petrochemical Co., Ltd.)

In the present disclosure, the petroleum resins are preferably used, and the alicyclic petroleum resin is more preferably used in order to improve the transparency, the color tone, and other appearance factors, and the odorless property of the resin composition for the intermediate layer. Particularly, the hydrogenated petroleum resin is preferably used.

The hydrogenation degree of the hydrogenated petroleum resin is not particularly limited, but the hydrogenated petroleum resin of the full hydrogenation type is preferably used.

The hydrocarbon resin typically has a number average molecular weight of 100 to 3,000, preferably not less than 300 and less than 1,500, particularly preferably not less than 400 and less than 1,000. If the number average molecular weight is excessively low, the hydrocarbon resin is liable to be liquified in a material feeder during the melt mixing. Particularly, when the liquified hydrocarbon resin has a low viscosity, mixing failure is liable to occur. Therefore, the film transparency is liable to be reduced due to uneven dispersion of the hydrocarbon resin. If the number average molecular weight is excessively high, the hydrocarbon resin is liable to separate from the EVOH and, therefore, the formed product is liable to suffer from gumming, streaking, and other appearance defects.

The number average molecular weight may be calculated based on a polystyrene equivalent value determined through measurement by gel permeation chromatography (GPC).

The hydrocarbon resin typically has a softening point of not lower than 60° C. and lower than 170° C., preferably not lower than 95° C. and lower than 160° C., particularly preferably not lower than 110° C. and lower than 150° C. If the softening point is excessively low, the hydrocarbon resin is liable to bleed from the formed product. If the softening point is excessively high, the hydrocarbon resin is liable to be partly left unmelted during the melt mixing, thereby causing fisheyes and other abnormalities in a formed film product.

A method according to JIS K2207 (ring and ball method) may be employed for measurement of the softening point.

The hydrocarbon resin typically has a color tone corresponding to a Gardner number of not greater than 3, preferably not greater than 2, particularly preferably not greater than 1. If the Gardner number is greater than 3, the resin composition is liable to be poorer in appearance properties with a higher yellowness degree.

Where the hydrocarbon resin is the hydrogenated petroleum resin, the hydrocarbon resin typically has a Hazen number of not greater than 200, preferably not greater than 150, particularly preferably not greater than 100. Where a hydrogenated petroleum resin having a Hazen number of not greater than 200 is used as the hydrocarbon resin, the resin composition is colorless and transparent, and excellent in appearance properties.

A method according to JIS K0071-1 (Hazen number) and a method according to JIS K0071-2 (Gardner number) may be used for measurement of the color tone.

The form of the hydrocarbon resin at an ordinary temperature is not particularly limited, but may be powdery form, aggregated form, flake form, pellet form (granular form), liquid form, or the like. The hydrocarbon resin is preferably in the flake form or the pellet form, particularly preferably in the pellet form, from the viewpoint of the working efficiency and the measuring efficiency in the mixing.

In the resin composition for the intermediate layer, the hydrocarbon resin is preferably present in a proportion of 1 to 30 wt. %, more preferably 3 to 25 wt. %, still more preferably 5 to 20 wt. %, based on the overall amount of the resin composition. If the proportion of the hydrocarbon resin is excessively great, the intermediate layer tends to have a lower mechanical strength and, hence, the standup pouch including the intermediate layer tends to have a lower overall strength. If the proportion of the hydrocarbon resin is excessively small, on the other hand, the water vapor permeability tends to be increased.

A method for adding the hydrocarbon resin to the resin composition for the intermediate layer is not particularly limited, but examples of the method include dry blending method and melt kneading method.

The intermediate layer may further contain a component other than the polypropylene resin and the hydrocarbon resin.

The intermediate layer to be used in the present disclosure may be a single layer or may include a plurality of layers. The intermediate layer has a thickness of 5 to 100 μm, more preferably 15 to 70 μm, still more preferably 20 to 50 μm. If the thickness of the intermediate layer is excessively small, the water vapor permeability tends to be increased. If the thickness of the intermediate layer is excessively great, the bag drop impact resistance tends to be reduced.

<Heat Seal Resin Layer>

The heat seal resin layer to be used in the present disclosure is thermally meltable, so that such heat seal resin layers can be melt-bonded to each other.

In the present disclosure, a conventionally known resin having heat sealability (heat seal resin) is usable as a resin for the heat seal resin layer. Examples of the heat seal resin include: polyolefin resins such as polyethylene, polypropylene resins (homopolypropylene (propylene homopolymer), and random copolymer or block copolymer of propylene with α-olefin such as ethylene, 1-butene, 1-pentene, 1-hexene, 1-heptene, 1-octene, 1-nonene or 1-decene), ethylene-vinyl acetate copolymer, ionomer resin, ethylene-ethyl acrylate copolymer, ethylene-acrylic acid copolymer, ethylene-methacrylic acid copolymer, ethylene-propylene copolymer, and methylpentene polymer; and acid-modified polyolefin resins obtained by modifying any of the aforementioned polyolefin resins with acrylic acid, methacrylic acid, maleic anhydride, fumaric acid, and other unsaturated carboxylic acids. These may be used alone or in combination.

Where the multilayer structure of the present disclosure is used for the standup pouch, a linear low-density polyethylene (LLDPE) or any of the polypropylene resins, which can provide a rigid film, is preferred as the heat seal resin in order to impart the standup pouch with a sufficient self-supporting property.

The heat seal resin layer may optionally further contain a component other than the heat seal resin. A thermoplastic elastomer is preferably contained as the optional component in a resin composition for the heat seal resin layer for improvement of various physical properties (e.g., bag drop impact resistance). Examples of the thermoplastic elastomer include olefin thermoplastic elastomer, styrene thermoplastic elastomer, and urethane thermoplastic elastomer. Of these, the olefin thermoplastic elastomer is particularly preferred. More preferably, the olefin thermoplastic elastomer and the polypropylene resin are contained as the optional component.

The resin composition for the heat seal resin layer may further contain a hydrocarbon resin. Specific examples of the hydrocarbon resin include those to be used for the intermediate layer.

In the resin composition for the heat seal resin layer, the heat seal resin is preferably present in a proportion of 60 to 99 wt. %, more preferably 70 to 95 wt. %, still more preferably 75 to 90 wt. %, based on the overall amount of the resin composition. If the proportion of the heat seal resin is excessively great, the flexibility tends to be insufficient, thereby reducing the bag drop impact resistance. If the proportion of the heat seal resin is excessively small, the seal strength tends to be insufficient.

In the resin composition for the heat seal resin layer, the thermoplastic elastomer is preferably present in a proportion of 5 to 40 wt. %, more preferably 10 to 30 wt. %, still more preferably 15 to 25 wt. %, based on the overall amount of the resin composition. If the proportion of the thermoplastic elastomer is excessively great, the melting point tends to be reduced, making it impossible to provide a sufficient heat resistance. If the proportion of the thermoplastic elastomer is excessively small, the flexibility tends to be insufficient, thereby reducing the bag drop impact resistance.

The heat seal resin layer to be used in the present disclosure may be a single layer or may include a plurality of layers. The heat seal resin layer preferably has a thickness of 1 to 150 μm, more preferably 3 to 100 μm, still more preferably 5 to 55 μm. If the thickness of the heat seal resin layer is excessively small, the seal strength of a seal portion tends to be reduced. If the thickness of the heat seal resin layer is excessively great, the multilayer structure tends to have a higher rigidity, so that the standup pouch formed from the multilayer structure is liable to have a poorer openability when being filled with food or the like.

<Adhesive Resin Layer>

The multilayer structure of the present disclosure may further include an adhesive resin layer. The adhesive resin layer is provided for increasing the adhesive strength of the respective layers. If the adhesive resin layer is not properly provided, the layers are liable to be delaminated with a slight force, so that the multilayer structure is not durable enough for use as the standup pouch. The adhesive resin layer is provided in a desired position.

A known adhesive resin may be used as the adhesive resin for the adhesive resin layer. The adhesive resin may be, for example, a modified polyolefin polymer containing a carboxyl group. The modified polyolefin polymer may be obtained by chemically bonding an unsaturated carboxylic acid or its anhydride to a polyolefin resin by an addition reaction, a graft reaction, or the like.

Examples of the modified polyolefin polymer include maleic anhydride graft-modified polyethylene, maleic anhydride graft-modified polypropylene, maleic anhydride graft-modified ethylene-propylene (block and random) copolymer, maleic anhydride graft-modified ethylene-ethyl acrylate copolymer, maleic anhydride graft-modified ethylene-vinyl acetate copolymer, maleic anhydride-modified polycyclic olefin resin, and maleic anhydride graft-modified polyolefin resin. These may be used alone or in combination as a mixture.

The adhesive resin layer preferably has a thickness of 1 to 30 μm, more preferably 2 to 20 μm, particularly preferably 3 to 10 μm.

<Adhesive Agent Layer>

The multilayer structure of the present disclosure may further include an adhesive agent layer used for laminating two types of layers. A dry-lamination adhesive agent may be used for the adhesive agent layer. Examples of the dry-lamination adhesive agent include two-liquid component curable urethane adhesive, polyester urethane adhesive, polyether urethane adhesive, acrylic adhesive, polyester adhesive, polyamide adhesive, and epoxy adhesive, which may be used alone or in combination. An exemplary method for laminating the protective layer and the barrier layer with the use of any of these adhesives is a dry lamination method.

Of the aforementioned adhesives, the two-liquid component curable urethane adhesive is preferred, which is excellent in adhesive strength and is less likely to suffer from reduction in adhesive strength in the presence of urethane bonds.

The two-liquid component curable urethane adhesive includes a base agent and a curing agent, and is preferably a two-liquid component curable urethane adhesive including a polyester polyol and a polyfunctional polyisocyanate. Examples of the polyfunctional polyisocyanate include diphenylmethane diisocyanate (MDI), hexamethylene diisocyanate (HDI), toluene diisocyanate (TDI), and isophorone diisocyanate (IPDI).

The thickness of the adhesive agent layer is not particularly limited, but is preferably not less than 0.1 µm, more preferably not less than 1 µm, particularly preferably not less than 2 µm, in order to provide a sufficient adhesive strength after the retort treatment.

<Other Resin Layer>

The multilayer structure of the present disclosure may further include an additional resin layer other than the aforementioned layers. In the multilayer structure, the additional resin layer may be provided in a desired position.

A known resin may be used as a resin for the additional resin layer. Examples of the known resin include polyaramid resin, polyethylene resin, polycarbonate resin, polyacetal resin, and fluororesin.

<Layer Configuration>

In the multilayer structure of the present disclosure, the polyamide resin layer is preferably provided adjacent to at least one of opposite major surfaces of the EVOH layer. More preferably, the polyamide resin layers are provided adjacent to the opposite major surfaces of the EVOH layer. Where the polyamide resin layers are provided adjacent to the EVOH layer, the recovery speed of the oxygen barrier property after the retort treatment tends to be increased.

Exemplary layer configurations of the multilayer structure of the present disclosure include: protective layer/polyamide resin layer/EVOH layer/intermediate layer/heat seal resin layer; protective layer/EVOH layer/polyamide resin layer/intermediate layer/heat seal resin layer; and protective layer/polyamide resin layer/EVOH layer/polyamide resin layer/intermediate layer/heat seal resin layer.

The multilayer structure of the present disclosure may optionally further include the adhesive resin layer and the adhesive agent layer in any of the aforementioned layer configurations.

Of these, a layer configuration of protective layer/adhesive agent layer/polyamide resin layer/EVOH layer/polyamide resin layer/adhesive resin layer/intermediate layer/heat seal resin layer or a layer configuration of protective layer/adhesive agent layer/polyamide resin layer/EVOH layer/polyamide resin layer/adhesive agent layer/intermediate layer/heat seal resin layer is preferred from the viewpoint of the bag drop impact resistance.

<Thicknesses of Layers>

The multilayer structure of the present disclosure preferably has an overall thickness of not less than 30 µm, more preferably 30 to 700 µm, still more preferably 50 to 450 µm, particularly preferably 70 to 300 µm. If the overall thickness of the multilayer structure is excessively small, the multilayer structure to be used for the standup pouch tends to have an insufficient rigidity for the self-supporting property of the standup pouch. If the overall thickness of the multilayer structure is excessively great, the standup pouch is liable to have an excessively high rigidity and, therefore, tends to have a poorer openability when being filled with food or the like.

The multilayer material preferably has a thickness of 1 to 150 µm, more preferably 5 to 145 µm, particularly preferably 10 to 140 µm, which depends upon the use purpose, the package form, and the required physical properties of the multilayer structure.

The ratio (Te/Tp) between the thickness (Te) of the EVOH layer and the thickness (Tp) of the polyamide resin layer is preferably 0.02 to 10, more preferably 0.05 to 5, particularly preferably 0.1 to 1.0. Where the thickness ratio (Te/Tp) falls within the aforementioned range, the effects of the present disclosure tend to be more effectively provided. Where the EVOH layer and the polyamide resin layer each include a plurality of layers, the ratio between the total thickness of the plural EVOH layers and the total thickness of the plural polyamide resin layers may fall within the aforementioned range.

The ratio (Te/Th) between the thickness (Te) of the EVOH layer and the total thickness (Th) of the heat seal resin layer and the intermediate layer is preferably 0.05 to 0.8, more preferably 0.1 to 0.5, particularly preferably 0.2 to 0.4. Where the thickness ratio (Te/Th) falls within the aforementioned range, the effects of the present disclosure tend to be more effectively provided. Where the EVOH layer, the heat seal resin layer, and the intermediate layer each include a plurality of layers, the ratio between the total thickness of the plural EVOH layers and the total thickness of the plural heat seal resin layers and the plural intermediate layers may fall within the aforementioned range.

The thickness ratio (Th1/Th2) between the heat seal resin layer (Th1) and the thickness (Th2) of the intermediate layer is preferably 0.05 to 20, more preferably 0.1 to 10, particularly preferably 0.2 to 5. Where the thickness ratio (Th1/Th2) falls within the aforementioned range, the effects of the present disclosure tend to be more effectively provided.

<Production Method for Multilayer Structure>

Exemplary methods for producing the multilayer structure of the present disclosure include: (1) a method in which the multilayer material including the barrier layer (the polyamide resin layer and the EVOH layer), the intermediate layer, and the heat seal resin layer is laminated on the protective layer; (2) a method in which the barrier layer (the polyamide resin layer and the EVOH layer), the intermediate layer, and the heat seal resin layer are laminated on the protective layer; and (3) a method in which some of the protective layer, the barrier layer (the polyamide resin layer and the EVOH layer), the intermediate layer, and the heat seal resin layer are preliminarily laminated together, and then the other layers are laminated on the resulting laminate.

First, description will be given to a production method for producing the multilayer material including the barrier layer (the polyamide resin layer and the EVOH layer), the intermediate layer, and the heat seal resin layer, particularly, the multilayer material (polyamide resin layer/EVOH layer/intermediate layer/heat seal resin layer), by laminating the polyamide resin layer, the EVOH layer, the intermediate layer, and the heat seal resin layer in this order.

Exemplary lamination methods for the multilayer material include melt forming method, wet lamination method, dry lamination method, solventless lamination method, extrusion lamination method, coextrusion lamination method, and inflation method. Of these, the melt forming method is preferred from the environmental viewpoint without the use of a solvent and from the viewpoint of the costs without the need for separately performing a lamination step.

A known method may be used as the melt forming method. Examples of the melt forming method include extrusion forming methods (T-die extrusion, tubular film extrusion, blow molding, melt spinning, anisotropic extrusion, and the like), and injection molding method. In general, the melt forming temperature is properly selected from a range of 150° C. to 300° C.

As described above in the section <Layer Configuration>, the multilayer material may optionally include the adhesive resin layer and/or the adhesive agent layer. The production of the multilayer material including these layers may be achieved by the same methods as described above.

Next, a method for laminating the protective layer and the multilayer material will be described.

A lamination method to be used for producing an ordinary packaging material may be used for laminating the protective layer and the multilayer material. Examples of the lamination method include wet lamination method, dry lamination method, solventless lamination method, extrusion lamination method, coextrusion lamination method, and inflation method.

For the lamination, as required, a pretreatment such as corona treatment, ozone treatment or flame treatment may be optionally performed on the surface of the lamination base.

In the dry lamination method, a lamination adhesive agent such as of solvent type, aqueous type or emulsion type containing a vinyl, acryl, polyurethane, polyamide, polyester or epoxy vehicle as a major vehicle component may be used.

In this case, an adhesive aid may be optionally used, and examples of the adhesive aid include isocyanate adhesive aid, polyethyleneimine adhesive aid, and other anchor coating agents.

In the above extrusion lamination method, an acid-modified polyolefin resin may be used as a melt extrusion lamination resin. Examples of the acid-modified polyolefin resin include those obtained by modifying a polyolefin resin such as polyethylene, polypropylene, ethylene-vinyl acetate copolymer, ionomer resin, ethylene-ethyl acrylate copolymer, ethylene-acrylic acid copolymer, ethylene-methacrylic acid copolymer, ethylene-propylene copolymer or methylpentene polymer with an unsaturated carboxylic acid such as acrylic acid, methacrylic acid, maleic anhydride or fumaric acid.

A layer configuration including plural types of protective layers and the multilayer material (e.g., protective layer/ protective layer/multilayer material) is also possible. Further, a layer configuration of protective layer/multilayer material/protective layer is also possible. The plural types of protective layers may be laminated by the same methods as described above.

<Use of Multilayer Structure>

The multilayer structure of the present disclosure can be advantageously used as various packaging materials for general foods, condiments such as mayonnaise and dressing, fermented foods such as miso, fat and oil such as salad oil, beverages, cosmetics, pharmaceutical products, and the like. The multilayer structure of the present disclosure may be formed into any package shape such as bottle, bag or standup pouch.

The multilayer structure of the present disclosure is excellent in gas barrier properties after heat sterilization treatment and, therefore, is useful as a packaging material to be subjected to the retort treatment. The multilayer structure is particularly useful for the standup pouch, particularly for a standup pouch to be subjected to the retort treatment.

[Standup Pouch]

The standup pouch produced by using the multilayer structure of the present disclosure has a body portion and a bottom portion disposed perpendicularly to the body portion, and has a rigidity sufficient to support itself when being filled with a content.

<Structure of Standup Pouch>

FIG. 2 is an overall perspective view showing the standup pouch produced by using the multilayer structure of the present disclosure by way of example. The standup pouch 5 of the present disclosure includes body films 6 located on the front and back sides, and a bottom film 7. The body films 6 and the bottom film 7 are flexible, and prepared by cutting the multilayer structure of the present disclosure into desired sizes. The body films and the bottom film of the multilayer structure of the present disclosure are disposed with the multilayer material located on the inner side and with the protective layer located on the outer side.

The bottom film 7 is inserted in a folded state between lower portions of the body films 6, 6, and lower edges of the body films 6, 6 and peripheral edges of the bottom film 7 are sealed, whereby a bottom seal portion 8 is formed. Then, right and left side edges of the stacked body films 6, 6 are sealed, whereby side seal portions 9 are formed. Thus, the standup pouch 5 is provided in a state such that the bottom film 7 is unfolded with a content put in the pouch.

In the present disclosure, an upper portion of the standup pouch 5 is open and, in this state, the standup pouch 5 is filled with a desired content such as beverage, food or the like from the upper opening. Then, the upper opening is heat-sealed, whereby an upper seal portion is formed. Thus, a semifinished packaged product is produced. Thereafter, the semifinished packaged product is subjected to the retort treatment such as a pressurized heat sterilization treatment. Thus, a packaged retort food product can be produced in any of various forms.

The standup pouch of the present disclosure may have a spout or a design pattern provided at a desired position thereof.

The multilayer structure portion of the standup pouch 5 excluding the spout has, for example, a width W of 50 to 1,000 mm, preferably 100 to 500 mm, particularly preferably 100 to 200 mm, and a height H of 50 to 1,000 mm, preferably 100 to 500 mm, particularly preferably 150 to 300 mm. The bottom portion of the standup pouch 5 has a depth D of 10 to 500 mm, preferably 20 to 300 mm, particularly preferably 30 to 100 mm.

The ratio (H/W) between the height H and the width W is, for example, 0.2 to 10, preferably 1 to 5, particularly preferably greater than 1 and not greater than 2. Where the ratio (H/W) falls within the above range, the visibility and the display efficiency of the standup pouch 5 tend to be improved. The dimensions of the standup pouch 5 can be adjusted to desired levels by adjusting the sizes of the body films 6 and the bottom film 7 for the standup pouch 5. In order to impart the standup pouch with a self-supporting property, the bottom film is inserted in the folded state between the body films, and then unfolded to bring the standup pouch into a self-supporting state.

The bottom film 7 itself is rectangular, but is formed into a substantially oval shape by properly dimensioning the heat seal portion in order to adjust the depth D of the bottom portion of the standup pouch 5 within the above range. The substantially oval shape defined by the bottom film 7 is dimensioned as having a major diameter equal to the width of the body films 6, and a minor diameter of 10 to 500 mm, preferably 20 to 300 mm, particularly preferably 30 to 100 mm. The minor diameter is typically 1 to 1.5 times the depth D of the bottom portion.

Next, a production method for the standup pouch of the present disclosure will be described specifically.

<Production Method for Standup Pouch>

For the production of the standup pouch, the multilayer structure of the present disclosure is slit to a predetermined width to form body films and a bottom film. As shown in FIG. 2, the body films 6, 6 are stacked one on the other with their multilayer material sides opposed to each other. The bottom film 7 is sandwiched between the lower portions of the body films 6, 6, and the bottom portion and the right and left side edges are sealed, whereby the bottom seal portion 8 and the right and left side seal portions 9 are formed. Thus, the standup pouch 5 is produced as having an opening in its top portion, i.e., in its upper portion. At this time, a plurality of unsealed void portions are formed in at least one of the side seal portions 9 so as to be longitudinally surrounded by sealed portions.

Then, air is injected into the void portions. A method of forming air-filled portions will be briefly described. An injection hole for the injection of air is formed at a longitudinal end of each of the void portions. The injection hole may be a hole (not shown) extending through the body film 6. For the injection of air through the injection hole, an injection nozzle is brought into abutment against the injection hole. After air is injected into the void portion to an intended air amount, a part of the void portion offset from the injection hole is sealed, whereby the air-filled portion is formed. Then, the injection hole is sealed. That is, the injection hole is sealed with the heat seal layer. Thus, the air-filled portions are each formed.

The standup pouch thus formed has an improved self-supporting property, and is free from deformation which may otherwise occur due to the bending of the side seal portions and the buckling of the package after the content is consumed to a reduced amount. On the other hand, the standup pouch can be bent between the air-filled portions and, therefore, can be stored with its package volume reduced. When the standup pouch is discarded after use, the package volume can be reduced by bending and folding the standup pouch between the air-filled portions.

The standup pouch is produced by using the multilayer structure of the present disclosure for at least some of the body films and the bottom film. In order to more effectively provide the effects of the present disclosure, the standup pouch is most preferably produced by using the multilayer structure of the present disclosure for all of the body films and the bottom film.

<Content in Standup Pouch>

Exemplary contents to be packaged in the standup pouch produced by using the multilayer structure of the present disclosure include various foods and beverages such as cooked foods, fishery paste products, frozen foods, stewed foods, rice cakes, liquid soups, condiments, drinking water. Specific examples of the contents include curry, stew, soup, meat sauce, hamburger, meat balls, Chinese Shaomai, Japanese Oden, liquid foods such as rice gruel, jelly-like foods, condiments, and water. In the present disclosure, where the content contains liquid, the effects of the present disclosure tend to be more effectively provided.

EXAMPLES

Embodiments of the present disclosure will hereinafter be described specifically by way of examples. It should be understood that the embodiments of the present disclosure be not limited to these examples.

[Ingredients]

The following ingredients were used for multilayer structures. Incidentally, "PET" means polyethylene terephthalate, "Ny" means nylon, "EVOH" means ethylene-vinyl alcohol copolymer, "PP" means polypropylene, and "PE" means polyethylene.

(Protective Layer)

PET1: FE2001A available from Futamura Chemical Co., Ltd.

(Barrier Layer (Polyamide Resin Layer and EVOH Layer))

Ny1: 1022B (nylon 6) available from Ube Industries, Ltd.

Ny2: S6011 (polyamide MXD6) available from Mitsubishi Gas Chemical Company, Inc.

EVOH: EVOH having an ethylene content of 29 mol %, a saponification degree of 99.7 mol %, an MFR of 6.1 g/10 minutes (as measured at 230° C. with a load of 2160 g)

(Intermediate Layer and Heat Seal Resin Layer)

PP1: A mixture containing 90 wt. % of homopolypropylene (NOVATEC PP EA7AD available from Japan Polypropylene Corporation) and 10 wt. % of hydrocarbon resin (P-115 (hydrogenated petroleum hydrocarbon resin) available from Arakawa Chemical Industries, Ltd., and having a number average molecular weight of 710 and a softening point of 115° C.)

PP2: A mixture containing 80 wt. % of block polypropylene (NOVATEC PP BC6DRF available from Japan Polypropylene Corporation and 20 wt. % of thermoplastic elastomer (TAFMER A1085S (propylene-α-olefin copolymer) available from Mitsui Chemicals, Inc.)

PE: Polyethylene (NOVATEC LL UF240 available from Japan Polypropylene Corporation)

(Adhesive Resin Layer)

Tie: Plexar PX6002 available from LyondellBasell, Inc.

(Adhesive Agent Layer)

Adh: Dry lamination adhesive agent (containing TM-242A available from Toyo Morton, Ltd. as a base agent, CAT-RT37L available from Toyo Morton, Ltd. as a curing agent, and ethyl acetate in a ratio of (base agent):(curing agent):(ethyl acetate)=17:1.5:19.2)

Example 1

With the use of an inflation multilayer film forming apparatus, a multilayer material having a layer configuration of Ny1 (10 μm)/EVOH (20 μm)/Ny2 (10 μm)/Tie (5 μm)/PP1 (45 μm)/PP2 (10 μm) was prepared. The parenthesized numerals indicate the thicknesses of the respective layers.

<Production of Multilayer Structure>

(Film Forming Conditions)

Ny1 layer: 40 mmφ single-screw extruder (with a barrel temperature of 240° C.)

EVOH layer: 40 mmφ single-screw extruder (with a barrel temperature of 230° C.)

Ny2 layer: 40 mmφ single-screw extruder (with a barrel temperature of 260° C.)

Tie layer: 40 mmφ single-screw extruder (with a barrel temperature of 240° C.)

PP1 layer: 40 mmφ single-screw extruder (with a barrel temperature of 240° C.)

PP2 layer: 40 mmφ single-screw extruder (with a barrel temperature of 240° C.)
PE layer: 40 mmφ single-screw extruder (with a barrel temperature of 240° C.)
die: Spiral die (with a die temperature of 230° C.)
Film folding width: 600 mm A multilayer structure was produced by dry-laminating the multilayer material prepared in the aforementioned manner on a 12 μm-thick PET1 layer with the Adh applied in a solid amount of 3 g/m² between the multilayer material and the PET1 layer. The multilayer structure was aged at 40° C. for 48 hours.

The resulting multilayer structure had a layer configuration of PET1 (12 μm)/Adh (3 μm)/Ny1 (10 μm)/EVOH (20 μm)/Ny2 (10 μm)/Tie (5 μm)/PP1 (45 μm)/PP2 (10 μm), and had an overall thickness of 115 μm.

Example 2

A multilayer material having a layer configuration of Ny1 (10 μm)/EVOH (20 μm)/Ny1 (5 μm)/Ny2 (10 μm)/Tie (5 μm)/PP1 (35 μm)/PP2 (20 μm) was prepared in substantially the same manner as in Example 1.

A multilayer structure was produced in substantially the same manner as in Example 1 by laminating the resulting multilayer material on a 12 μm-thick PET1 layer with the Adh applied in an amount of 3 g/m² between the multilayer material and the PET1 layer.

The resulting multilayer structure had a layer configuration of PET1 (12 μm)/Adh (3 μm)/Ny1 (10 μm)/EVOH (20 μm)/Ny1 (5 μm)/Ny2 (10 μm)/Tie (5 μm)/PP1 (35 μm)/PP2 (20 μm), and had an overall thickness of 120 μm.

Example 3

A multilayer material having a layer configuration of Ny1 (10 μm)/EVOH (20 μm)/Ny1 (5 μm)/Ny2 (10 μm)/Tie (5 μm)/PP1 (25 μm)/PP2 (30 μm) was prepared in substantially the same manner as in Example 1.

A multilayer structure was produced in substantially the same manner as in Example 1 by laminating the resulting multilayer material on a 12 μm-thick PET1 layer with the Adh applied in an amount of 3 g/m² between the multilayer material and the PET1 layer.

The resulting multilayer structure had a layer configuration of PET1 (12 μm)/Adh (3 μm)/Ny1 (10 μm)/EVOH (20 μm)/Ny1 (5 μm)/Ny2 (10 μm)/Tie (5 μm)/PP1 (25 μm)/PP2 (30 μm), and had an overall thickness of 120 μm.

Comparative Example 1

A multilayer material having a layer configuration of Ny1 (10 μm)/EVOH (20 μm)/Ny2 (10 μm)/Tie (5 μm)/PP2 (55 μm) was prepared in substantially the same manner as in Example 1.

A multilayer structure was produced in substantially the same manner as in Example 1 by laminating the resulting multilayer material on a 12 μm-thick PET1 layer with the Adh applied in an amount of 3 g/m² between the multilayer material and the PET1 layer.

The resulting multilayer structure had a layer configuration of PET1 (12 μm)/Adh (3 μm)/Ny1 (10 μm)/EVOH (20 μm)/Ny2 (10 μm)/Tie (5 μm)/PP2 (55 μm), and had an overall thickness of 115 μm.

Comparative Example 2

A multilayer structure was produced in substantially the same manner as in Comparative Example 1, except that the multilayer material was prepared by using the PP1 (55 μm) instead of the PP2 (55 μm).

The resulting multilayer structure had a layer configuration of PET1 (12 μm)/Adh (3 μm)/Ny1 (10 μm)/EVOH (20 μm)/Ny2 (10 μm)/Tie (5 μm)/PP1 (55 μm), and had an overall thickness of 115 μm.

Comparative Example 3

A multilayer structure was produced in substantially the same manner as in Example 3, except that the multilayer material was prepared by using the PE (25 μm) instead of the PP1 (25 μm).

The resulting multilayer structure had a layer configuration of PET1 (12 μm)/Adh (3 μm)/Ny1 (10 μm)/EVOH (20 μm)/Ny1 (5 μm)/Ny2 (10 μm)/Tie (5 μm)/PE (25 μm)/PP2 (30 μm), and had an overall thickness of 120 μm.

[Evaluation of Multilayer Structures]
(Oxygen Permeability (Oxygen Barrier Property) after Retort Treatment)

A standup pouch (having a width of 140 mm, a height of 180 mm, a bottom minor diameter of 60 mm, and a bottom depth of 58 mm) was produced by using each of the multilayer structures produced in Examples and Comparative Examples described above. A bag making apparatus BH-60D available from Totani Corporation was used for the production of the standup pouch. A sealing temperature for the side seal portions and the point seal portions at intersections between the side edges and the bottom edges was set to 220° C., and a sealing temperature for the bottom seal portions was set to 230° C.

The resulting standup pouch was filled with 300 mL of water. Then, the upper edge of the standup pouch was heat-sealed while air was substantially prevented from entering the standup pouch.

Next, the standup pouch filled with water was subjected to hot water treatment at 120° C. for 30 minutes with the use of an immersion type hot water treatment apparatus (available from Hisaka Works, Ltd.), and then taken out of the hot water treatment apparatus. The water was discarded, and then the oxygen permeability of the standup pouch was measured at 23° C. at an internal humidity of 100% RH at an external humidity of 50% RH with the use of an oxygen gas permeability measurement apparatus (OX-TRAN 2/21 available from Common, Inc.) after a lapse of 5 days. In the unit "cc/pkg·day·air" of the oxygen permeability, "pkg" is the abbreviation of package, meaning that the oxygen permeability of the entire standup pouch was measured. In the unit "cc/pkg·day·air" of the oxygen permeability, "air" means that air (having an oxygen partial pressure of 0.2 atm) was used for the measurement of the oxygen permeability.

(Water Vapor Permeability)

A standup pouch was produced in the aforementioned manner (in the same manner as the standup pouch used for the measurement of the oxygen permeability (oxygen barrier property), and filled with 300 mL of water.

Subsequently, the standup pouch filled with water was subjected to hot water treatment at 120° C. for 30 minutes with the use of an immersion type hot water treatment apparatus (available from Hisaka Works, Ltd.), and then taken out of the hot water treatment apparatus. While the standup pouch was stored in an environment at 23° C. at 50% RH, the weight increase amount was measured at a predetermined time interval for determination of a weight change with time. Then, the water vapor permeability (WVTR (g/m²·day)) was calculated.

Further, the weight change rate per year (annual weight change rate) of the standup pouch was calculated based on the resulting water vapor permeability. The annual weight change rate was calculated, for example, from the following expression. The annual weight change rate is preferably as small as possible in consideration of the adverse influence on the content in the standup pouch.

AWCR=[WVTR×SA×365 (days)/WC]×100(%)

wherein AWCR is the annual weight change rate, WVTR is the water vapor permeability (g/m²·day), SA is the surface area (m²) of the standup pouch, and WC is the weight (g) of the content in the standup pouch.

In Examples, the surface area of the standup pouch was 0.066 m², and the weight of the content (water) was 300 g.

(Heat Sealability)

Films of each of the multilayer structures were sealed with the heat seal resin layers of the multilayer materials thereof in contact with each other with a seal width of 10 mm at a seal temperature of 210° C. or 250° C. at a seal pressure of 0.1 MPa for a seal period of 1 second with the use of a heat seal tester IMC-A043 available from Imoto Machinery Co., Ltd. The films thus sealed were cut to a width of 15 mm, and the T-peel strength was measured at a stretching rate of 300 mm/minute with a chuck distance of 30 mm by means of an autograph AGS-5kNX available from Shimadzu Corporation. Thus, the multilayer structures were each evaluated for heat sealability. Retort food products are practically required to have a heat seal strength of not less than 23 N/15 mm. Therefore, the evaluation was based on a reference value of 23 N/15 mm.

(Evaluation Criteria)
○ (acceptable): not less than 23 N/15 mm
x (unacceptable): less than 23 N/15 mm ther, the multilayer structures of Comparative Examples 1 to 3 are poorer in heat sealability and bag drop impact resistance.

The results shown in Table 1 also indicate that the multilayer structures of Examples 1 to 3 each have a lower oxygen permeability after the hot water treatment, and is excellent in oxygen barrier property.

While specific forms of the embodiments of the present disclosure have been shown in the aforementioned examples, the examples are merely illustrative but not limitative. It is contemplated that various modifications apparent to those skilled in the art could be made within the scope of the disclosure.

The multilayer structure of the present disclosure satisfies the requirements for the lower water vapor permeability and the sufficient heat sealability and, therefore, is advantageous as packaging materials, particularly for standup pouches, for foods, beverages, cosmetics, pharmaceutical products, and the like to be subjected to the heat treatment.

REFERENCE SIGNS LIST

1: PROTECTIVE LAYER
2: BARRIER LAYER
2a: POLYAMIDE RESIN LAYER
2b: EVOH LAYER
3a: INTERMEDIATE LAYER
3b: HEAT SEAL RESIN LAYER
4: MULTILAYER MATERIAL
5: STANDUP POUCH
6: BODY FILM
7: BOTTOM FILM
8: BOTTOM SEAL PORTION
9: SIDE SEAL PORTION
10: MULTILAYER STRUCTURE

TABLE 1

|  | Example 1 | Example 2 | Example 3 | Comparative Example 1 | Comparative Example 2 | Comparative Example 3 |
|---|---|---|---|---|---|---|
| Oxygen permeability (cc/pkg · day · air) | $1.0 \times 10^{-3}$ | $3.8 \times 10^{-3}$ | $4.0 \times 10^{-3}$ | $3.1 \times 10^{-3}$ | — | — |
| Water vapor permeability | | | | | | |
| WVTR (g/m² · day) | 0.21 | 0.23 | 0.26 | 0.38 | — | 1.1 |
| Annual weight change rate (%) | 1.7 | 1.8 | 2.1 | 3.1 | — | 8.9 |
| Heat sealability | | | | | | |
| At 210° C. | ○ | ○ | ○ | ○ | x | ○ |
| At 250° C. | ○ | ○ | ○ | ○ | x | ○ |

In Table 1, "—" means that the measurements were not performed.

As can be understood from the results shown in Table 1, the standup pouches produced by using the multilayer structures of Examples 1 to 3 each have a lower water vapor permeability. Therefore, for example, the deterioration of the quality of the content can be prevented, which may otherwise occur when the moisture of the content escapes out of the standup pouch. Further, the multilayer structures of Examples 1 to 3 are excellent in heat sealability and bag drop impact resistance.

On the other hand, the standup pouches produced by using the multilayer structures of Comparative Examples 1 to 3 each have a higher water vapor permeability. Therefore, the moisture of the content is liable to escape out of the standup pouch to easily deteriorate the quality of the content. Fur-

The invention claimed is:

1. A multilayer structure comprising:
 a protective layer;
 an ethylene-vinyl alcohol copolymer layer;
 a heat seal resin layer; and
 an intermediate layer provided between the ethylene-vinyl alcohol copolymer layer and the heat seal resin layer, and comprising a polypropylene resin;
 wherein the intermediate layer further comprises a hydrocarbon resin having a number average molecular weight of 100 to 3,000, and a softening point of not less than 60° C. and less than 170° C.

2. The multilayer structure according to claim 1, wherein the hydrocarbon resin is present in a proportion of 1 to 30 wt. % based on an overall amount of a resin composition forming the intermediate layer.

3. The multilayer structure according to claim 1, wherein the polypropylene resin is homopolypropylene.

4. The multilayer structure according to claim 1, wherein the heat seal resin layer is provided adjacent to one major surface of the intermediate layer.

5. The multilayer structure according to claim 1, further comprising a polyamide resin layer provided adjacent to at least one major surface of the ethylene-vinyl alcohol copolymer layer.

6. The multilayer structure according to claim 1, which has an overall thickness of not less than 30 μm.

7. A standup pouch comprising the multilayer structure according to claim 1.

* * * * *